United States Patent [19]
Nelson

[11] Patent Number: 6,085,260
[45] Date of Patent: Jul. 4, 2000

[54] METHOD AND CIRCUIT FOR MULTIPLEXING AN INPUT PORT AND AN OUTPUT PORT OF A MICROPROCESSOR INTO A SINGLE EXTERNAL INTERFACE

[75] Inventor: Eric Robert Nelson, Dearborn Heights, Mich.

[73] Assignee: Ford Motor Company, Dearborn, Mich.

[21] Appl. No.: 09/093,566

[22] Filed: Jun. 8, 1998

[51] Int. Cl.[7] .................................................. G06F 13/28
[52] U.S. Cl. .................................................. 710/20
[58] Field of Search ............................. 710/20; 712/220

[56] References Cited

U.S. PATENT DOCUMENTS

| | | | |
|---|---|---|---|
| 4,264,984 | 4/1981 | Lovelace | 710/51 |
| 4,328,578 | 5/1982 | Bell et al. | 370/100 |
| 4,839,572 | 6/1989 | Steely | 318/603 |
| 5,261,056 | 11/1993 | Lyke | 710/132 |
| 5,483,692 | 1/1996 | Person et al. | 455/238 |
| 5,619,722 | 4/1997 | Lovrenich | 710/2 |
| 5,652,870 | 7/1997 | Yamasaki et al. | 395/500 |
| 5,689,731 | 11/1997 | West et al. | 710/62 |
| 5,694,557 | 12/1997 | Yang | 710/129 |
| 5,822,776 | 10/1998 | Korte et al. | 711/167 |

*Primary Examiner*—David Y. Eng
*Attorney, Agent, or Firm*—Mark L. Mollon; Roger L. May

[57] ABSTRACT

A method and circuit interface for multiplexing an input port and an output port of a microprocessor into a single external interface, wherein the input port and the output port never operate at the same time, is normally active upon a battery cycle, includes a resistor network, a level shifter and a power supply. The resistor network is coupled between the output port and the single external interface for receiving an input signal from the single external interface for receipt by the input port and for receiving an output signal from the output port for receipt by the single external interface. The level shifter is coupled to the input port and the resistor network for translating the input signal from the resistor network into a second input signal recognizable by the input port. The power supply is coupled to the resistor network and the level shifter for providing power to the input port so as to enable the input port to recognize the second input signal.

17 Claims, 4 Drawing Sheets

METHOD AND CIRCUIT FOR MULTIPLEXING AN INPUT PORT AND AN OUTPUT PORT OF A MICROPROCESSOR INTO A SINGLE EXTERNAL INTERFACE

TECHNICAL FIELD

This invention relates to methods and circuits for multiplexing an input port and an output port of a microprocessor into a single external interface.

BACKGROUND ART

There are times in which a product is manufactured with a microprocessor having a pin/port that functions as both an input port and an output port. Testing and verification of this product typically involves using a testing interface that has one port that also functions as an output port and an input port. However, if a subsequent model of the product is manufactured with a microprocessor having separate ports to perform the functions of the single input/output port, then the testing interface is no longer feasible for mating with the product. The testing/development engineer must build a new testing interface to accommodate the new version of the product, thereby incurring extra cost and complexity.

DISCLOSURE OF THE INVENTION

It is thus a general object of the present invention to provide a method and circuit interface for multiplexing a separate input port and a separate output port of a microprocessor into a single external interface for use with testing interfaces that embody only one port.

In carrying out the above object and other objects, features, and advantages of the present invention, a method is provided for multiplexing an input port and an output port of a microprocessor into a single external interface, the microprocessor having control logic for preventing operation of the input port and the output port at the same time. The method includes providing a resistor network coupled between the output port and the single external interface for receiving an input signal from the single external interface for receipt by the input port and for receiving an output signal from the output port for receipt by the single external interface. The method further includes translating the input signal from the resistor network into a second input signal recognizable by the input port. Finally, the method includes providing power to the input port so as to enable the input port to recognize the second input signal.

In further carrying out the above object and other objects, features, and advantages of the present invention, a circuit interface is provided for carrying out the method steps described above. The circuit interface includes a resistor network, a level shifter, and a power supply. The resistor network is coupled between the output port and the single external interface for receiving an input signal from the single external interface for receipt by the input port and for receiving an output signal from the output port for receipt by the single external interface. The level shifter is coupled to the input port and the resistor network for translating the input signal from the resistor network into a second input signal recognizable by the input port. The power supply is coupled to the resistor network and the level shifter for providing power to the input port so as to enable the input port to recognize the second input signal.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
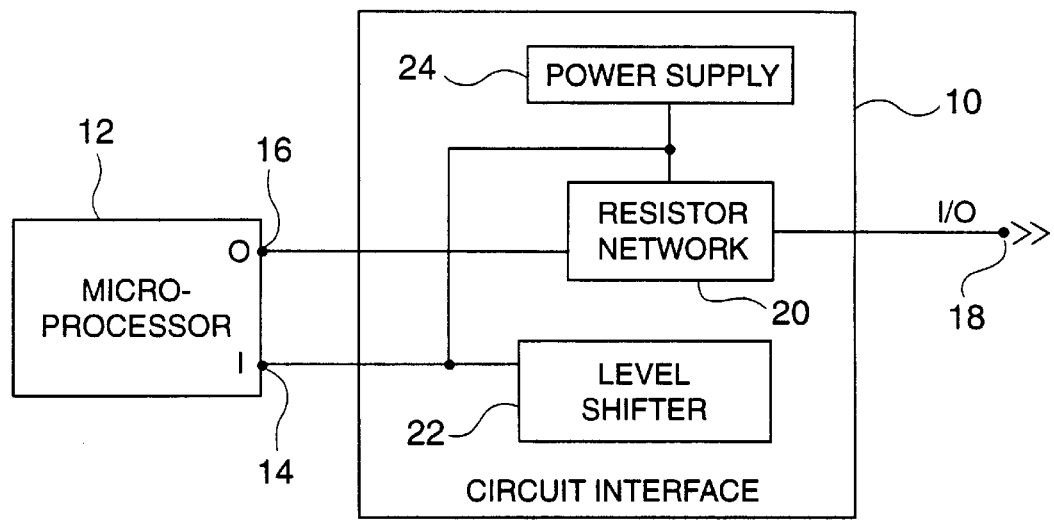
FIG. 1 is a block diagram of the circuit interface of the present invention.

Turning now to FIG. 1, there is shown a block diagram of the circuit interface of the present invention, denoted generally by reference numeral 10. A microprocessor 12 having an input port 14 and an output port 16 are coupled to the circuit interface 10 to provide a single external interface 18. The microprocessor 12 includes control logic (not shown) for preventing operation of the input port 14 and the output port 16 at the same time. That is, the input port 14 and the output port 16 are never utilized during the same time period.

The circuit interface 10 includes a resistor network 20, coupled between the output port 16 and the single external interface 18, for combining the input port 14 and the output port 16. The resistor network 20 receives an input signal from the single external interface 18 for receipt by the input port 14 and receives an output signal from the output port 16 for receipt by the single external interface 18.

The circuit interface 10 further includes a level shifter 22 coupled to the input port 14 and the resistor network 20 for translating the input signal from the resistor network 20 into a second input signal recognizable by the input port 14. The level shifter 22 is needed since the resistor network 20 prevents the full power voltage from reaching the input port 14. There is typically a minimum voltage which the input port 14 will recognize as a "high" and a maximum voltage which the input port 14 will recognize as a "low". Since the resistor network 20 reduces the voltage to the input port 14 to a point below this minimum threshold, the voltage must be increased, or shifted up, to the correct reference level.

Finally, the circuit interface 10 includes a power supply 24 coupled to the input port 14 and the resistor network 20 for providing power to the input port 14 so that the input port 14 can recognize the input signal translated by the level shifter 22. The power supply 24 is compatible with the microprocessor being used, such as a 5 volt DC power supply.

Figure 2:
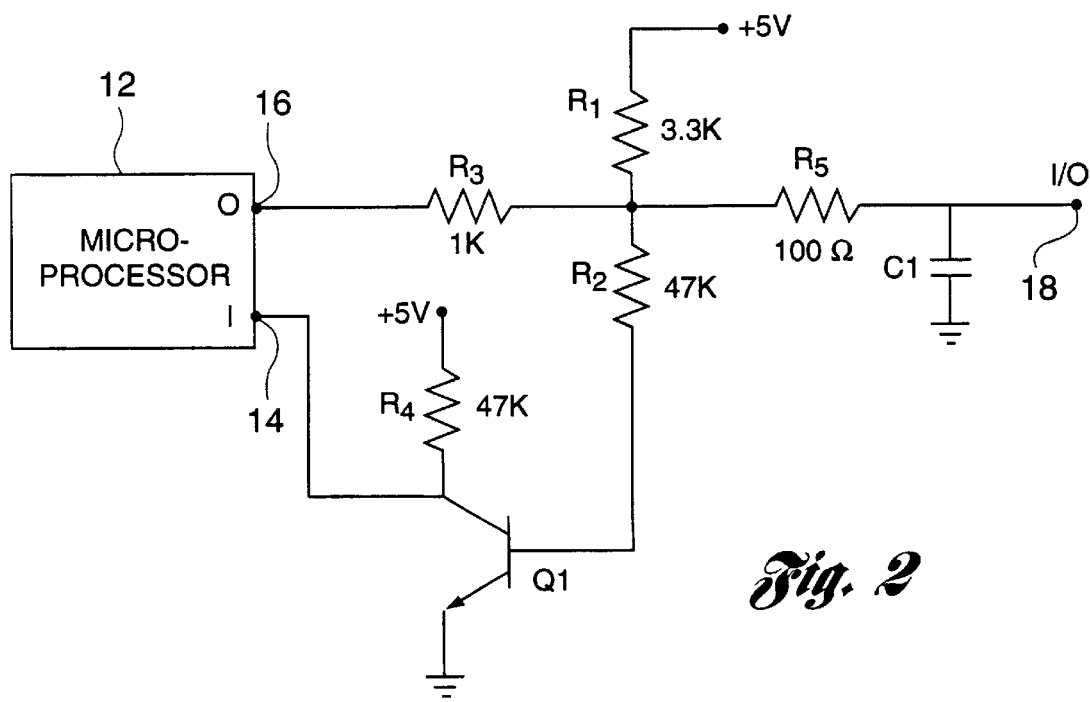
FIG. 2 is a schematic diagram of the circuit interface of the present invention.

Turning now to FIG. 2, there is shown a schematic diagram of the circuit interface 10 of the present invention.

Resistor network 20 is preferably a voltage divider consisting of resistors R1 and R2 connected in series between the power supply 24 and level shifter 22. Resistor R2 has an impedance which is significantly larger than an impedance of resistor R1 in order to minimize the effect of the power supply 24 on the signal from the output port 16. Resistor R1 is preferably 3.3 kilohm and R2 is preferably 47 kilohm.

A third resistor R3 is coupled to the resistor network 20 between the voltage divider resistors R1 and R2 at one terminal and the output port 16 at the other terminal so as to further prevent power from being supplied to the output port 16. In automotive vehicle applications, resistor R3 also prevents damage from occurring at the output port 16 in the event of any unusual transient voltages that may be applied to the single interface 18. Resistor R3 is preferably 1 kilohm.

Level shifter 22 consists of an NPN transistor Q1 for switching the voltage from resistor R2 ON and OFF in order to reach the full voltage supplied from the power supply 24, i.e., 5 volts, at the input port 14. (Anything else we should add here about the level shifter?) In order to limit the current through the transistor Q1 to a safe level, a limiting resistor R4 is coupled between the transistor Q1 and the power supply 24. Resistor R4 is preferably 47 kilohm.

To aid in reducing electromagnetic interference, an RC circuit is included in the circuit interface 10. The RC circuit consists of a resistor R5 and a capacitor C1. Resistor R5 is coupled between the output of the resistor network 20, or voltage divider, between resistors R1 and R2, and the single external interface 18. Capacitor C1 is coupled between resistor R5 and the single external interface 18 at one terminal and coupled to ground at another terminal. Preferably, resistor R5 is 100 ohm and capacitor C1 is 100 pF.

Figure 3A:
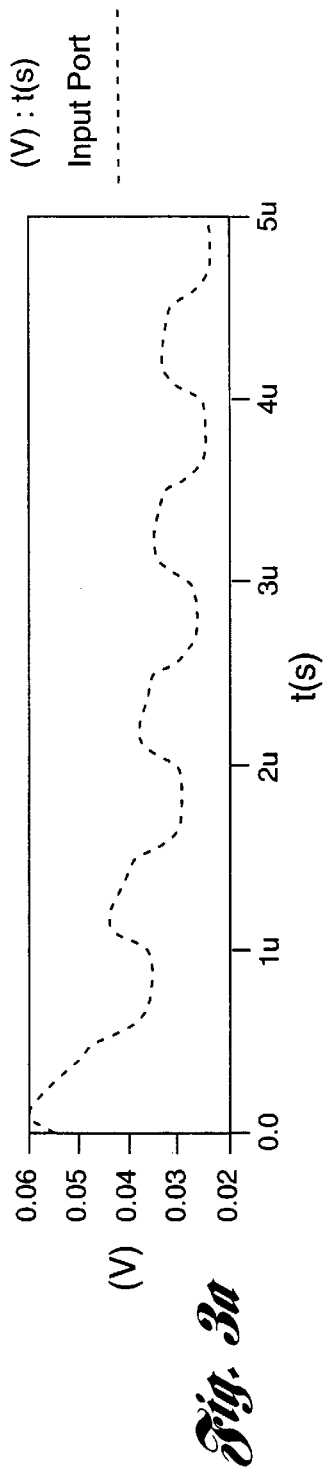
FIGS. 3a–3c are graphs illustrating simulation results for operation of the circuit interface when the output port is active and the single external interface is open.
Figure 3B:
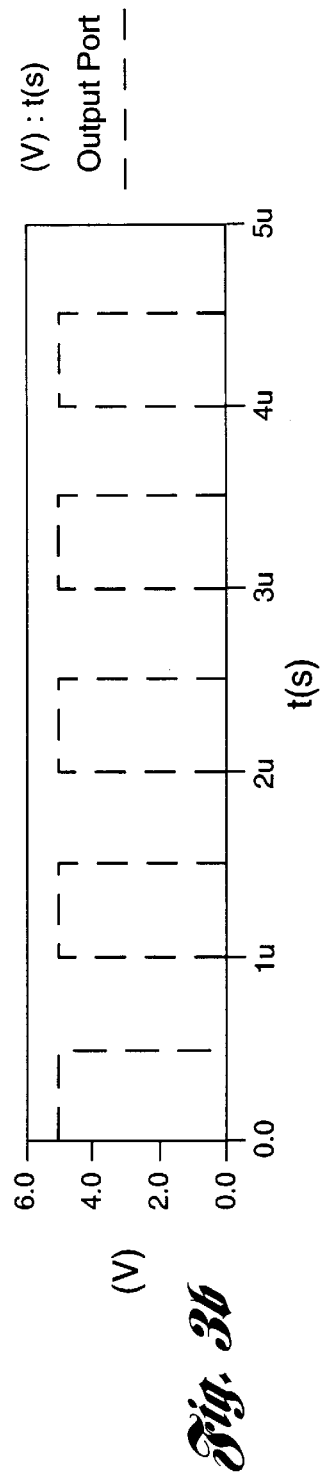
Figure 3C:
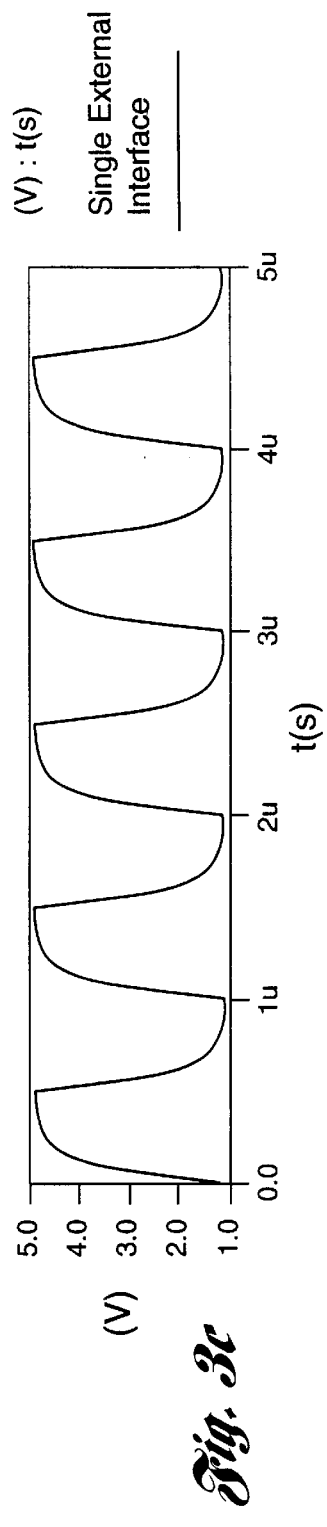
Figure 4A:
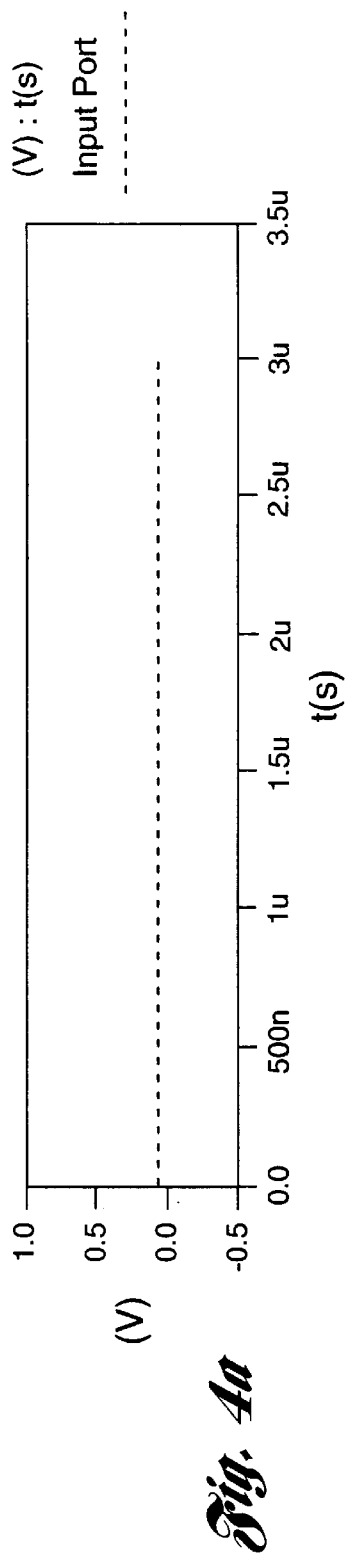
FIGS. 4a–4c are graphs illustrating simulation results for operation of the circuit interface when the output port is grounded and the single external interface is open.
Figure 4C:
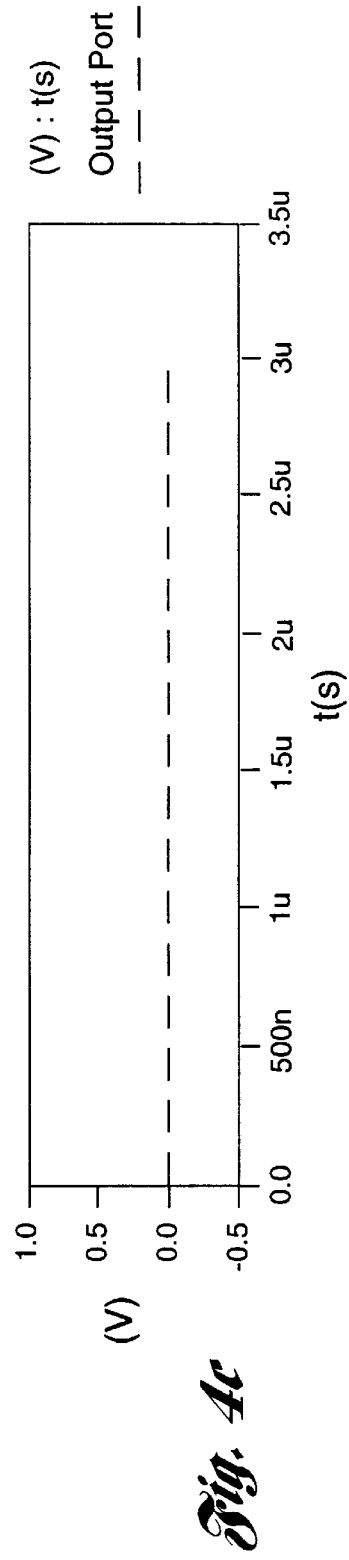
Figure 4B:
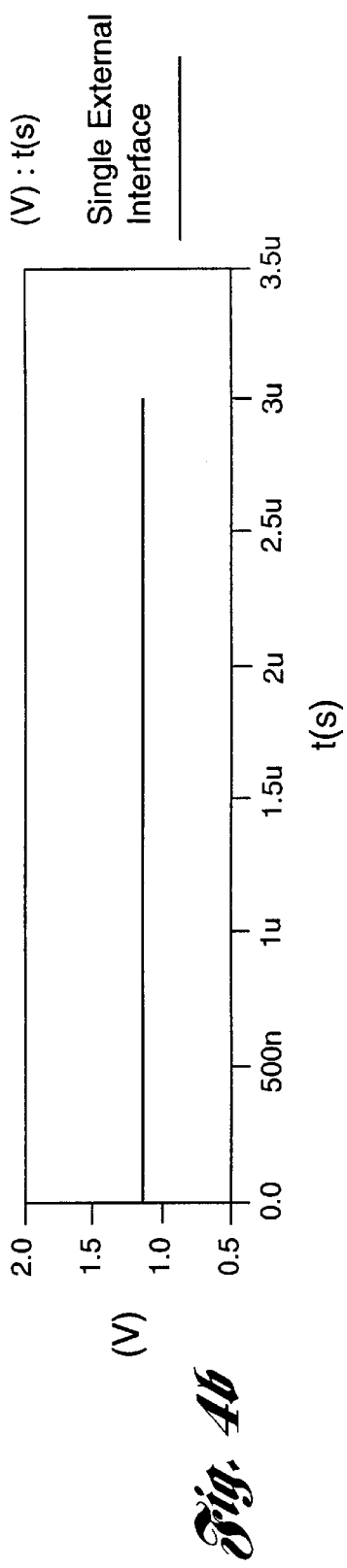
Figure 5A:
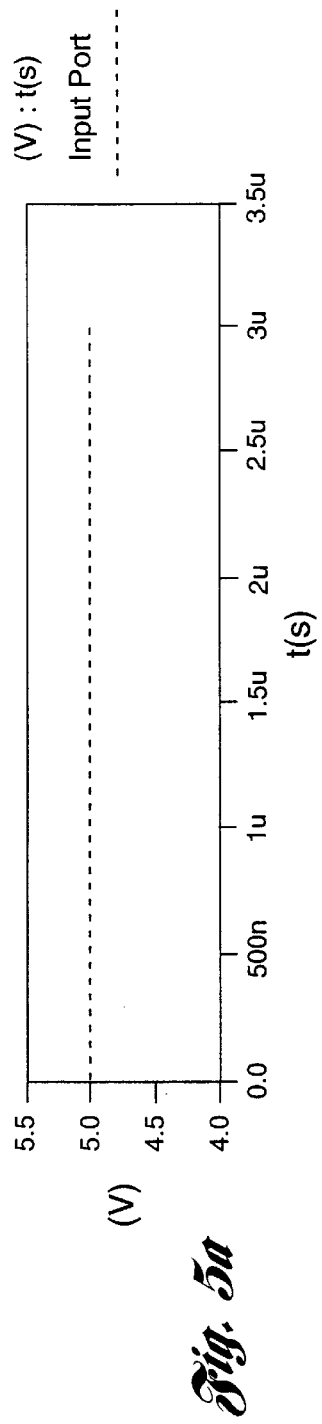
FIGS. 5a–5c are graphs illustrating simulation results for operation of the circuit interface when the output port and the single external interface are grounded.
Figure 5B:
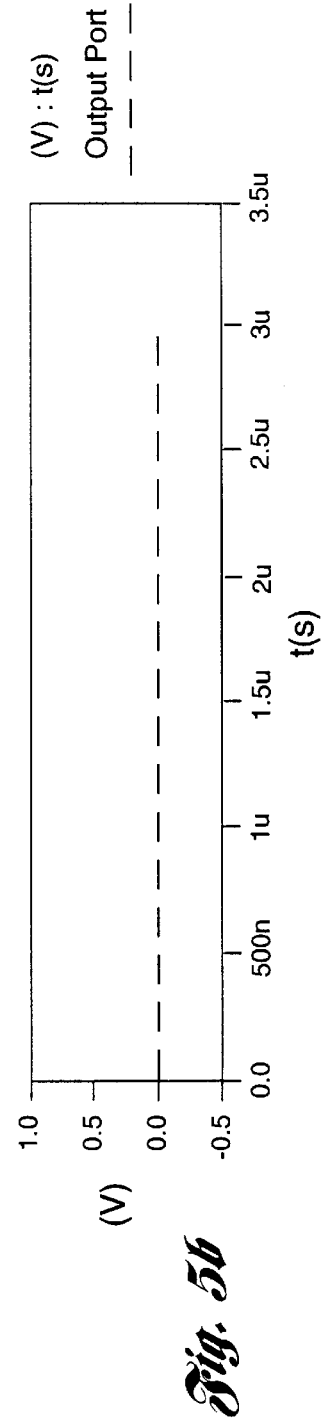
Figure 5C:
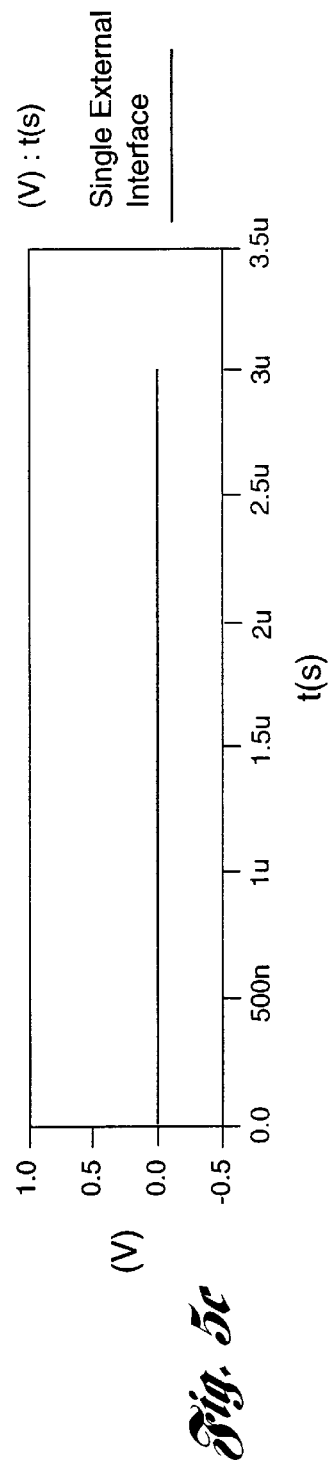

Simulations were performed to verify operation of the circuit interface 10. The circuit interface 10 should provide certain results as defined below:

1) If output port 16 is active and the interface 18 is open, then an output signal should appear at the single external interface 18, as illustrated in FIGS. 3a–3c;

2) If the output port 16 is active and the single external interface 18 is grounded, then there should be no damage to the output port 16;

3) If the output port 16 is grounded (i.e., not active) and the single external interface 18 is open, then 0 volts should appear at input port 14, as shown in FIGS. 4a–4c; and 4) If the output port 16 is grounded and the interface 18 is grounded, then a 5 volt signal should appear at input port 14, as shown in FIGS. 5a–5c.

While the best modes for carrying out the invention have been described in detail, those familiar with the art to which this invention relates will recognize various alternative designs and embodiments for practicing the invention as defined by the following claims.

What is claimed is:

1. A method for multiplexing an input port and an output port of a microprocessor into a single external interface, the microprocessor further including control logic for preventing operation of the input port and the output port at the same time, the method comprising:

providing a resistor network coupled between the output port and the single external interface for receiving an input signal from the single external interface for receipt by the input port and for receiving an output signal from the output port for receipt by the single external interface;

translating the input signal from the resistor network into a second input signal recognizable by the input port; and providing power to the input port so as to enable the input port to recognize the second input signal.

2. The method as recited in claim 1 wherein providing the resistor network includes providing a voltage divider.

3. The method as recited in claim 2 further comprising providing a secondary circuit coupled between the voltage divider and the single external interface for reducing electromagnetic interference.

4. The method as recited in claim 3 wherein the secondary circuit includes a resistor and a capacitor.

5. The method as recited in claim 4 further comprising providing a second resistor coupled between the output port and the resistor network for preventing power from being supplied to the output port.

6. The method as recited in claim 1 wherein translating includes ensuring that a full voltage supplied by the power is applied to the input port.

7. A circuit interface for multiplexing an input port and an output port of a microprocessor into a single external interface, the microprocessor further including control logic for preventing operation of the input port and the output port at the same time, the circuit interface comprising:

a resistor network coupled between the output port and the single external interface for receiving an input signal from the single external interface for receipt by the input port and for receiving an output signal from the output port for receipt by the single external interface;

a level shifter coupled to the input port and the resistor network for translating the input signal from the resistor network into a second input signal recognizable by the input port; and a power supply coupled to the resistor network and the level shifter for providing power to the input port so as to enable the input port to recognize the second input signal.

8. The circuit interface as recited in claim 7 wherein the resistor network is a voltage divider.

9. The circuit interface as recited in claim 8 wherein the voltage divider includes a first resistor having a corresponding first and second terminal and a second resistor having a corresponding first and second terminal wherein the first terminal of the first resistor is coupled to the power supply, the second terminal of the first resistor is coupled to the first terminal of the second resistor, the output port and the single external interface, and wherein the second terminal of the second resistor is coupled to the level shifter.

10. The circuit interface as recited in claim 9 wherein the first and second resistors each have an impedance, the impedance of the second resistor being significantly larger than the impedance of the first resistor.

11. The circuit interface as recited in claim 9 further comprising a secondary circuit coupled between the second terminal of the first resistor and the single external interface for reducing electromagnetic interference.

12. The circuit interface as recited in claim 11 wherein the secondary circuit includes a third resistor and a capacitor.

13. The circuit interface as recited in claim 12 wherein the third resistor includes a corresponding first and second terminal and the capacitor includes a corresponding first and second terminal, wherein the first terminal of the third resistor is coupled to the second terminal of the first resistor and the second terminal of the third resistor is coupled to the first terminal of the capacitor and the single external interface, and wherein the second terminal of the capacitor is coupled to ground.

14. The circuit interface as recited in claim 13 further comprising a fourth resistor for preventing the power supply from being supplied to the output port, the fourth resistor having a corresponding first and second terminal wherein the first terminal of the fourth resistor is coupled to the output port and the second terminal of the fourth resistor is coupled to the second terminal of the first resistor.

15. The circuit interface as recited in claim 7 wherein the level shifter includes a transistor for ensuring that a full voltage supplied by the power supply is applied to the input port.

16. The circuit interface as recited in claim 15 further comprising a limiting resistor coupled between the power supply and the level shifter for limiting a current through the transistor to a safe level.

17. The circuit interface as recited in claim 16 wherein the limiting resistor includes a corresponding first terminal and second terminal wherein the first terminal of the limiting resistor is coupled to the power supply and the second terminal is coupled to the transistor.

* * * * *